Figure 1:
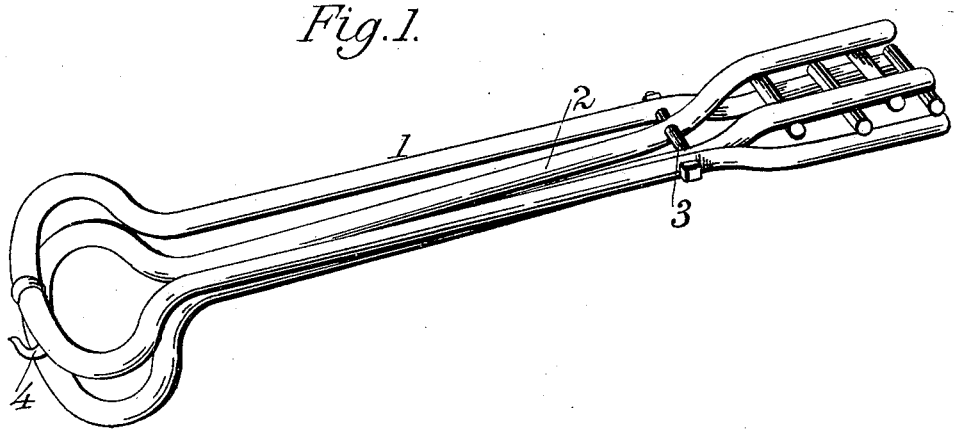

No. 621,327. Patented Mar. 21, 1899.
J. CONRAD.
WIRE TONGS.
(Application filed Oct. 5, 1898.)

(No Model.)

Witnesses:
J. S. Borren
J. H. Wilson

Inventor:
John Conrad
by H. B. Wilson & Co
Attorneys

UNITED STATES PATENT OFFICE.

JOHN CONRAD, OF WATSON, MISSOURI.

WIRE-TONGS.

SPECIFICATION forming part of Letters Patent No. 621,327, dated March 21, 1899.

Application filed October 5, 1898. Serial No. 692,673. (No model.)

*To all whom it may concern:*

Be it known that I, JOHN CONRAD, a citizen of the United States, residing at Watson, in the county of Atchison and State of Missouri, have invented certain new and useful Improvements in Wire-Tongs; and I do declare the following to be a full, clear, and exact description of the invention, such as will enable others skilled in the art to which it appertains to make and use the same.

My invention relates to improvements in tongs for handling wire; and the object is to provide a simple, inexpensive, and effective implement of this character.

To this end the invention consists in the construction, combination, and arrangement of the device, as will be hereinafter more fully described, and particularly pointed out in the claim.

In the accompanying drawings the same reference characters indicate the same parts of the invention.

Figure 2:
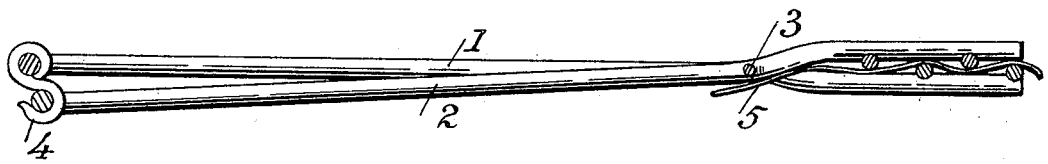

Figure 1 is a perspective view of my improved wire-tongs. Fig. 2 is a longitudinal section of the same.

1 and 2 designate similar members pivotally connected by a bolt 3 and each consisting of an open handle formed with parallel arms and having their opposite ends connected by the cross-bars, which form clamp-jaws, the cross-bars on the one member being alternately arranged with the corresponding cross-bars on the opposite member, as shown.

4 denotes a locking-hook pivoted to the grip-handle of one member and having its free hooked end arranged to be swung through the two handles and engage the other member.

5 denotes the end of the wire, which is clamped between the oppositely-disposed jaws, so as to crimp it between the cross-bars, and thereby firmly secure it, so that the wire may be drawn off of a coil or dragged from place to place, as desired.

The implement is particularly useful in handling hot or barbed wire, as well as smooth wire, and stretches of indefinite length may be reeled off the spool in building wire fences by clamping the free end of the wire between the jaws, as shown in Fig. 2, and securing the handles together by the locking-hook 4 and a horse or team to said hook to draw the wire along the course of the fence.

Various other uses will readily suggest themselves to wire-workers and those engaged in building and repairing wire fences.

Although I have specifically described the construction and relative arrangement of the several elements of my invention, I do not desire to be confined to the same, as such changes or modifications may be made as clearly fall within the scope of my invention without departing from the spirit thereof.

Having thus fully described my invention, what I claim as new and useful, and desire to secure by Letters Patent of the United States, is—

A wire-handling implement comprising the counterpart members 1 and 2 pivotally united, and each member having its free ends connected by alternately-arranged cross-bars, and a locking-hook 4 pivoted to one member and adapted to engage the opposite member to lock the jaws, substantially as shown and described.

In testimony whereof I have hereunto set my hand in presence of two subscribing witnesses.

JOHN CONRAD.

Witnesses:
 PATRICK HAYS,
 F. J. BAYLESS.